(12) United States Patent
Asher

(10) Patent No.: US 7,930,586 B1
(45) Date of Patent: Apr. 19, 2011

(54) ERROR RATE REDUCTION FOR MEMORY ARRAYS

(75) Inventor: Michael Asher, Green Cove Springs, FL (US)

(73) Assignee: AT&T Intellectual Property II, L.P.

( * ) Notice: Subject to any disclaimer, the term of this patent is extended or adjusted under 35 U.S.C. 154(b) by 486 days.

(21) Appl. No.: 12/069,143

(22) Filed: Feb. 7, 2008

(51) Int. Cl.
*G06F 11/00* (2006.01)

(52) U.S. Cl. ............ 714/6; 714/770; 714/784; 714/785

(58) Field of Classification Search .......................... None
See application file for complete search history.

(56) References Cited

U.S. PATENT DOCUMENTS

| | | | |
|---|---|---|---|
| 5,170,399 A | 12/1992 | Cameron et al. | |
| 7,149,847 B2* | 12/2006 | Frey et al. ..................... | 711/114 |
| 7,290,199 B2* | 10/2007 | Forhan et al. ................. | 714/770 |
| 7,353,423 B2* | 4/2008 | Hartline et al. ................. | 714/6 |
| 7,441,146 B2* | 10/2008 | Cavallo ............................. | 714/6 |
| 7,664,915 B2* | 2/2010 | Gopal et al. .................. | 711/114 |
| 2005/0050384 A1* | 3/2005 | Horn ................................. | 714/6 |
| 2006/0080505 A1* | 4/2006 | Arai et al. ..................... | 711/114 |
| 2006/0288161 A1* | 12/2006 | Cavallo .......................... | 711/114 |
| 2008/0162806 A1* | 7/2008 | Gopal et al. .................. | 711/114 |
| 2008/0276152 A1* | 11/2008 | Hughes .......................... | 714/770 |
| 2009/0313498 A1* | 12/2009 | Igashira et al. .................. | 714/6 |

* cited by examiner

*Primary Examiner* — Christopher S McCarthy
(74) *Attorney, Agent, or Firm* — Henry T. Brendzel

(57) ABSTRACT

A RAID 6 system, which has two strips to hold redundant data, employs a memory array controller that at each "read" operation considers not just the data but also the redundant information, even in the absence of any indication from the collection of memory controllers associated with the hard drives that any error condition exists. Thus, with each "read" operation the array controller checks the data for an unreported error, and takes corrective action when an error condition is discovered.

13 Claims, 2 Drawing Sheets

ERROR RATE REDUCTION FOR MEMORY ARRAYS

BACKGROUND

This invention relates to computer systems and, more particularly, to computer systems with means to enhance reliability of the storage medium that the computer system uses.

RAID (Redundant Array of Independent Drives) is a technique for creating what appears to be single logical storage device out of an array of physical hard drives, such as drives 11 in FIG. 1. The most common RAID technique is RAID level 5, in which a set of n separate physical hard drives are coalesced into a single memory array. The array is divided into stripes, as shown for example in FIG. 1, with a portion of each stripe—a "strip"—stored on each of the different physical drives in the set. Thus, n-1 of the strips hold data, and the $n^{th}$ strip holds parity information. The simplest way to visualize this arrangement is to think of one of the n hard drives holding the parity information. Many implementations, however, change the hard drive that holds the parity data from stripe to stripe.

When it is known that one of the hard drives that holds data fails to output proper data, the missing data can be reconstituted from the parity data. That is, when respective disk controllers 12 are able to report to array controller 13 that an error condition exists, controller 13 can recover the missing data, which allows the calling process to continue working while maintenance can take place on the failed drive, unaware that a problem was discovered. When data of a known drive is known to be wrong (and typically missing) the error is said to be an erasure error. As is well known, however, a single parity allows only one error can be detected (under the assumption that the probability of any other odd number of errors occurring concurrently is essentially zero), and thus when the location of the error is known (as in the case of erasure errors) the detected error can be corrected.

RAID level 6, which has recently been gaining in usage, employs two (or more) strips per stripe to hold redundant data, as illustrated in FIG. 2 for a system that employs exactly two strips per stripe to hold redundant data. The aim of such a RAID 6 system is to protect the array against two concurrent error conditions.

In both RAID 5 and RAID 6 systems the redundant data can be viewed as degenerates of a Reed-Solomon error-correcting code, based, for example, on Galois field $GF(2^8)$. The first redundant data strip (applies to both RAID 5 and RAID 6) holds the syndrome $$P = D_0 + D_1 + \ldots + D_{n-1} \quad (1)$$

and the second redundant data strip (RAID 6) holds the syndrome $$Q = g^0 \cdot D_0 + g^1 \cdot D_1 + \ldots + g^{n-1} \cdot D_{n-1} \quad (2)$$

where the polynomial g is a generator of the field and the "·" is multiplication over the field (which is NOT the normal multiplication), and the "+" designates the XOR operation. In $GF(2^8)$ there are 256 polynomial ($g^i$) coefficients, running from 0 to 255 and, therefore, equation (2) can handle 256 $D_i$ elements. If each $D_i$ element corresponds to the data of a strip, then operating in $GF(2^8)$ allows use of 256 data strips. Adding a strip for the P syndrome and a strip for the Q syndrome results in a maximum array of 258 hard drives, each of which stores/outputs 8 bit bytes.

There is another type of error for which current RAID techniques do not compensate, and that is the undetected read error. This occurs when, for a variety of reasons, controllers 12 fail to report a read error, and thus without an alert provides the wrong value for a read request. Such events are uncommonly rare—a bit error rate of 1 in $10^{17}$ or less—and are thus usually ignored because a typical consumer desktop hard drive may go several years without a single such error.

However, the situation for a large RAID array experiencing continual usage is quite different. An array of 20 drives that runs in a 24×7 environment can read as many as $3 \times 10^{17}$ bits/year, and can thus experience multiple undetected read errors per year. Each is potentially a catastrophic event, because it may result in the altering of a mission-critical value; for example, a bank account balance, a missile launch code, etc. The silent nature of the error means that it cannot be trapped, and thus no corrective action can be taken by software or manual means.

Clearly, at least in some applications, it is desirable to have a means for detecting and correcting unreported errors.

SUMMARY OF DISCLOSURE

An advance in the art is achieve in a RAID 6 system that employs two strips to hold redundant, and with each "read" request the memory array controller reads at least one of the redundant data strips in addition to reading the data strips, regardless of whether the controllers that are associated with the individual data storage element indicate the presence of an error. With the aid of the read redundant data strip the array controller checks to insure that no unreported error condition exists, and if one is found to exist the error is corrected with the aid of the second redundant data strip.

DETAILED DESCRIPTION

Figure 1:
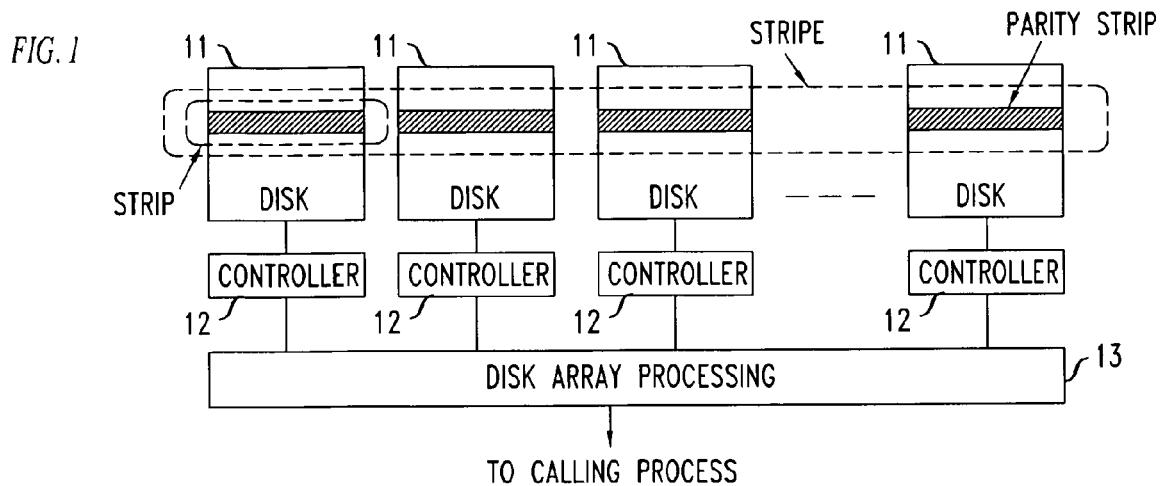
FIG. 1 depicts a disk array where data is stored in stripes of the array, where each stripe consists a strip in each of the disk, and where at least one of the strips provides a measure of redundancy for error control.

As indicated above, in both RAID 5 and RAID 6 systems the redundant data can be viewed as degenerates of a Reed-Solomon error-correcting code that is based, for example, on Galois field $GF(2^8)$. That is, the RAID 5 parity check corresponds to an RS(n,n-1) code, where n is the number of drives in the array, and the RAID 6 P and Q signatures are a RS(n, n-2) code.

Under the assumption that only one read error occurs that is not caught by controllers 12, in accord with the principles disclosed herein, data from the syndrome parity strip P is employed by array controller 13 as part of all read requests, and parity P' is computed in accordance with equation (1), and compared to the read parity P. When P'≠P it is concluded that an undetected read error has occurred, in which case data from syndrome strip Q is also used. The actual location of the error bit is determined, and the correct value is computed and substituted for erroneous data. This allows the error to be silently corrected without impacting the calling process.

To implement the above-disclosed approach, controller 13, which is the element that controls the entire array of hard drives, is modified to perform the error detection and correction. Specifically, when controller 12 is implemented with a stored program controlled processor and specialized hardware as disclosed below, the processor includes a subroutine such as the following read-data(address) subroutine:

```
read_data(address)   /read data from the array at 'address'
{
   read_disk_arrary(D)                /obtain the data from the individual disks (strips)
   p=identify_P_strip(address)                       /identify the strip that holds P
   P'=compute_P_excluding_strip(p)                                    /compute P'
   if D(a)<>P'then                 /error condition if read P is not the same as P'
      q=identify_Q_strip(address)                    /identify the strip that holds Q
      fixError( )                                                       /fix error
   End if
}
```

Of course, in order to fix the error, one must identify the strip in which the error occurs. Numerous techniques are known in the art for finding the strip that contains the error, e.g., Euclid's algorithm, Berlekamp-Massey, or some other similar well-known technique). See, for example, U.S. Pat. No. 5,170,399. The illustrative approach described below is a step-wise approach that is easy to understand. The algorithm considers each of the strips and computes a replacement D' for the considered strip based on the other strips and on the parity strip a replacement value. If the computed D' value is different from the read value then it is known that the strip under consideration is not the strip that contains the error.

fixError( )
{
For i=0 to (n-1)
compute D(j=i) from the other D(j< >i) values and P
compute Q' using the computed D(j=i).
if Q'< >Q then continue
else exit
end if
next
}

In a RAID 5 implementation, the only redundant data is the P' data, and therefore the presence of an unreported error can be deduced, but the location of the error itself cannot be ascertained. The error can be thus reported, but not corrected. Therefore, controller 13 propagates the error back up to the calling process to handle as it sees fit.

Figure 2:
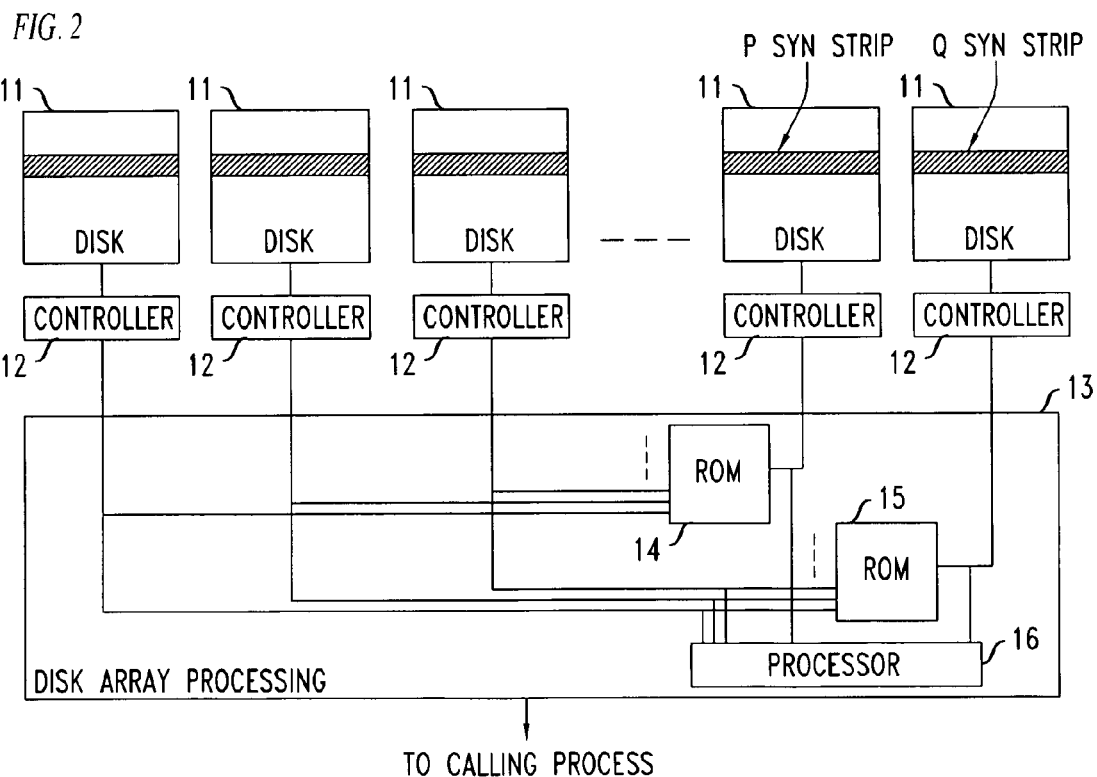
FIG. 2 depicts a RAID 6 disk array in accord with the principles disclosed herein.

In the course of storing data in the FIG. 2 array, and in the course of performing the fixError( ) function, the Q syndrome needs to be determined. Since multiplication over the $GF(2^8)$ field that is necessary to effect (see equation (2) above) is quite complex, it is useful to take advantage of one or more lookup tables.

One approach that is highly efficient is to use a lookup table for the P and the Q syndromes, implemented in one or two ROMs. The input to the address port of the ROM is the concatenation of the data that for which the syndromes need to be computed. To illustrate in connection with FIG. 2, where three data-holding strips are explicitly shown—each of which being one an 8-bit byte—in addition to the two redundant-data-holding strips, assuming that there are only the 3 data-holding strips, the address input to ROM 14 (which outputs an 8 bit byte corresponding to the P syndrome of equation (1)) is 24 bits long, which corresponds to an ROM that has a 24 bit address bus and stores $2^{24}$ 8 bit bytes i.e., 16 GBytes. The same is true for ROM 15, which outputs an 8 bit byte corresponding to the Q syndrome of equation (2).

In connection with the correcting of errors not reported by controllers 12, the above disclosed functions are carried out in processor 16 which, conveniently, may be a stored program controlled microprocessor.

To summarize a RAID 6 memory system that can store and deliver words that are 32 bits long can be implemented effectively with two ROMs, each of which has 16 Gbytes.

It may be observed that the above-disclosed approach of employing a ROM for developing the Q syndrome quickly becomes impractical to implement with current day ROM storage technologies. Four strips that hold 8-bit data (64-bit words) require a ROM for the Q syndrome that is 4 TBytes; and that is probably too large a memory for what can be economically purchased today.

An additional advance in the art is realized by employing $GF(2^4)$ rather than $GF(2^8)$. Working with $GF(2^4)$, the maximum number of data-holding strips that can be handled drops from 256 to 16, and each of the strips is a 4-bit nibble, which offers users a maximum word size of 64 bits.

Figure 3:
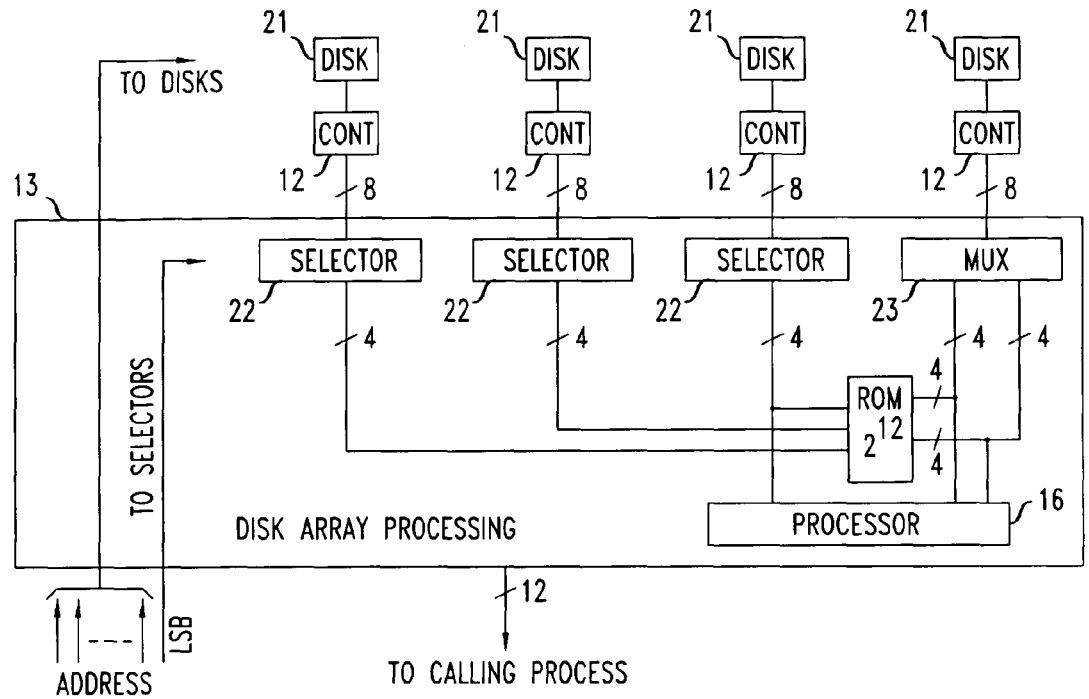
FIG. 3 depicts one embodiment of a disk array implementation that employs $GF(2^4)$ processing.

One approach for implementing a RAID 6 array that is based on $GF(2^4)$ is to use hard drives the store/output 4 bit-nibbles. If one is constrained to use hard drives that inherently operate with 8-bit bytes, this can be achieved simply by having a selector at the output of the hard drive that, based on one of the address bits (e.g., the least significant bit) exposes one or the other 4 bit nibble in the 8-bit word. An implementation along these lines is depicted in FIG. 3, which uses 3 data-holding hard drives. On the positive side, it should be noted that each of the ROM's holds only $2^{12}$ entries (4 Kbytes), as compared to the $2^{24}$ entries in the $GF(2^8)$ implementation, and the entries are only 4 bits long as compared to 8 bit entries in the $GF(2^8)$ implementation—which allows using one ROM that outputs 8 bits per address (4 bits for the P syndrome and 4 bits for the Q syndrome). On the negative side, each clock cycle handles only words that are 12 bits long compared to the 24 bits in the above-disclosed $GF(2^8)$ implementation.

Figure 4:
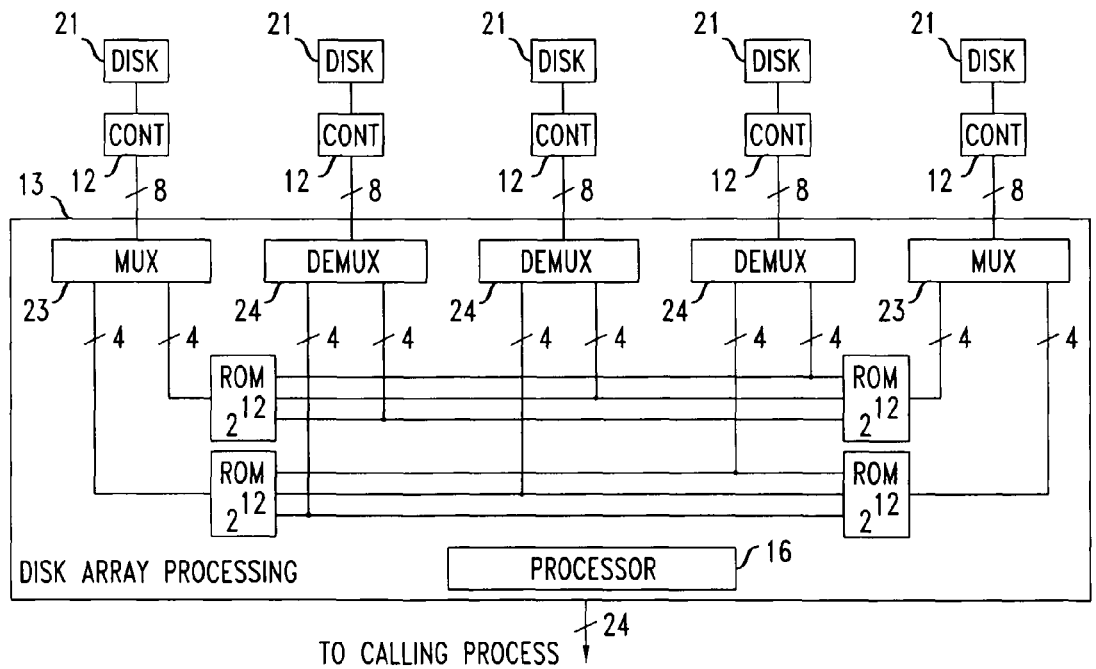
FIG. 4 depicts another embodiment of a disk array implementation that employs $GF(2^4)$ processing.

FIG. 4 depicts an implementation that handles 24 bits, and it should be noted that it requires a total of 4 ROM's each of which has $2^{12}$ entries that are 4 bits long, or 2 ROMs each of which has $2^{12}$ entries that are 8 bits long. Compared to the $GF(2^8)$ implementation that requires 2 ROMs that each contains $2^{24}$ entries, the FIG. 4 embodiment which requires 2 ROMs that each contains $2^{12}$ entries is very significantly less demanding. It may be noted that the FIG. 4 embodiment is limited to using not more than 16 hard drives, each providing 8 bits.

Another approach for computing the values of the Q and P syndromes that is not so limited focuses on the actual calculations that are represented by equations (1) and (2). Equation (1) is quite simple, since all that it requires is an XOR operation on n terms. Equation (2), however, requires n multiplications and XOR operations, and the bottleneck is the finite field multiplication across the $GF(2^8)$ Galois field.

Typically such multiplication is accelerated by taking the logarithm of both operands, adding the results module $2^8$ and then taking the anti-logarithm. This approach requires a log lookup table and an anti-log lookup table, and the operation requires 2 lookups of the log table, one modulo addition, and one lookup of the anti-log table, for a total of 3n lookups, n modulo additions, and (n-1) XOR operations; a total of 5n-1 operations.

Figure 5:
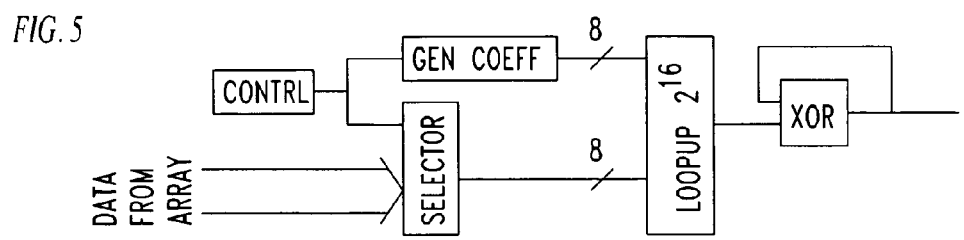
FIG. 5 shows an implementation that employs one single ROM-based lookup table for efficiently computing the Q syndrome for a RAID 6 array.

An advance in the art is realized by coalescing the three lookups and the modulo addition into a single table (a ROM), resulting in only n lookups and n-1 XOR operations, for a total of 2n-1 operations. The inputs to the ROM are a generator coefficient and a corresponding data word, for example, $g^1$ and $D_1$, each of which is 8 bits long. Hence, the ROM needs to have only $2^{16}$ 8 bit entries. This is depicted in FIG. 5, which includes a small controller to select the generator coefficient that is extracted from a generator coefficients ROM and the data elements that is routed to the output of the selector. The selected elements are applied to the aforementioned ROM, and the output of the ROM is applied to an XOR circuit whose output is fed back to the XOR circuit.

The invention claimed is:

1. A controller that interacts with a plurality of N memories, where (a) data to be stored is divided and stored in blocks, (b) the data of a block comprises N-i data strips, i being either 1 or 2, and i redundant-data strips that are associated with said N-i data strips and which, together with the N-i data strips, form a stripe of N strips, (c) the N strips of a stripe are stored in said N memories, respectively, (d) the i redundant-data strips of a stripe being adapted to be used in handling up to i errors that are discovered when an error arises upon reading at least said N-i data strips of a stripe, and (e) the controller includes a module, in response to a request from a user to provide a block of data, for reading N-i data strips from said N memories, the improvement comprising:

the module adapted to read, in response to every request for data, said N-i data strips and at least one of said i redundant data strips when reading a block data, even when there is no indication of any error in any of the N-i data strips that are read from said N memories;

when processing said N-i read data strips and the at least one of said i redundant data strips indicates an error condition in information contained in one of said N-i read data strips, taking corrective action.

2. The controller of claim 1 where, when i=1, the corrective action comprises informing said user of the indicated error condition.

3. The controller of claim 1 where, when i=2, one of the i redundant data strips is a parity strip, and said controller:

reads N-2 data strips responsive to said user request and the associated parity strip; determines whether an error condition exists in the read strips based on the N-2 read data strips and the associated read parity strip;

when a conclusion is reached that said error condition exists, reads remaining strip associated with the read N-2 data strips.

4. The controller of claim 3 where said corrective action identifies the error that gave rise to the error condition, and corrects the identified error, by using both of the two redundant data strips.

5. The controller of claim 1 where, when i=2, said controller:

reads N-2 data strips responsive to said user request and said 2 associated redundant data strips; and determines whether an error condition exists in the read strips based on said N-2 read data strips and one of the read redundant data strips.

6. The controller of claim 5 where said corrective action identifies the error that gave rise to the error condition, and corrects the identified error, by using both of the two redundant data strips.

7. The controller of claim 1 where i=2, the first redundant data strip associated with a block of data is a parity strip, P, and the second redundant data strip associated with said block of data is a syndrome, Q, computed from said N-2 data strips, where the computing is over a field, and said controller reads N-i data strips responsive to said user request and the associated parity strip, P; and determines whether an error condition exists in the read strips by computing a parity strip P' based on read N-i data strips, and concluding that an error exists when P'≠P.

8. The controller of claim 7 where said corrective action employs the Q syndrome to identify the strip of said N-2 strips that contains the error, and employs the P strip to correct the error.

9. The controller of claim 7 where Q is a Reed-Solomon code, RS(N,N-2).

10. The controller of claim 7 where $P=D_0+D_1+\ldots+D_{N-1}$, and $Q=g^0 \cdot D_0+g^1 \cdot D_1+\ldots+g^{N-1} \cdot D_{N-1}$, where $D_i$ is data of strip i, the "+" designates Exclusive OR operation, the "·" designates multiplication of a Galois field, and $g^i$ $i^{th}$ coefficient of a polynomial in said Galois field.

11. The controller of claim 10 where said strips P and Q are computed using a Read Only Memory (ROM).

12. The controller of claim 7 where said strips P and Q are obtained from a Read Only Memory (ROM).

13. A method comprising the steps of:

receiving a request for data at a given address of an array of N memories;

retrieving a data stripe from said given address of said array, the data stripe comprising strips $D_0, D_1, \ldots, D_{N-1}$, where $D_i$ is the strip of memory of index i, N-i of said strips holding data (data strips) and i of said strips holding redundant information (redundant information strips), and i=2;

identifying the read strip, P, that corresponds to a first of said redundant information strips;

computing a parity strip (P') based on said N-i data strips; and executing remedial action when P is not equal to P', where the remedial action fixes said error and submits valid results to process that submitted said request for data, and said remedial action comprises the steps of:

computing information of data strip $D_j'$, where j is a chosen value between 0 and N-2, from strips $D_0$ through $D_{N-2}$ other than $D_j$, and from strip P;

compute a second redundant strip, Q', using said strip $D_j'$;

if Q' equals a second redundant information strip that was retrieved by said step of retrieving, return $D_j'$ to process that submitted said request for data in lieu of $D_j'$ together with strips $D_0$ through $D_{N-2}$ other than $D_j$, and otherwise, choose another value of j and return to said step of computing.

* * * * *